United States Patent [19]

Palena

[11] 3,855,444

[45] *Dec. 17, 1974

[54] METAL BONDED NON-SKID COATING AND METHOD OF MAKING SAME

[76] Inventor: Maximilian Palena, 1000 Wayne Rd., Haddonfield, N.J. 08033

[ * ] Notice: The portion of the term of this patent subsequent to Mar. 17, 1987, has been disclaimed.

[22] Filed: Dec. 16, 1968

[21] Appl. No.: 783,901

[52] U.S. Cl.................... 219/76, 404/19, 404/20
[51] Int. Cl............................................ B23k 9/04
[58] Field of Search......... 94/5; 219/76, 77; 404/19, 404/20, 21

[56] References Cited
UNITED STATES PATENTS

| | | | |
|---|---|---|---|
| 1,657,446 | 1/1928 | Nagin | 94/5 |
| 1,803,875 | 5/1931 | Stoody | 219/77 X |
| 2,003,019 | 5/1935 | Strobel | 219/76 |
| 2,841,687 | 7/1958 | Richter | 219/76 |
| 2,847,555 | 8/1958 | Yenni | 219/76 |
| 2,994,762 | 8/1961 | Todd | 219/76 |
| 2,998,922 | 9/1961 | Gibson | 219/76 |
| 3,071,490 | 1/1963 | Pevar | 219/76 X |
| 3,423,559 | 1/1969 | Kuhns | 219/76 |
| 3,573,090 | 3/1971 | Peterson | 219/76 X |

Primary Examiner—J. V. Truhe
Assistant Examiner—G. R. Peterson
Attorney, Agent, or Firm—Sperry and Zoda

[57] ABSTRACT

A metal panel suitable for use as an aircraft landing mat. The panel has a rough non-skid coating of ceramic particles prebonded to each other and to the panel by aluminum droplets and bonded with an aluminum coating. The method of making a panel as described, comprising cleaning the surface of a metal panel, spreading ceramic grit thereon, bonding the grit particles to each other and to the metal panel by the impact of a relatively low velocity plurality of heat softened aluminum particles. The final coating is provided by the relatively high velocity electric arc aluminum spray, with other bonding metals and non-skid grit.

6 Claims, 4 Drawing Figures

METAL BONDED NON-SKID COATING AND METHOD OF MAKING SAME

BACKGROUND OF THE INVENTION

1. Field of the Invention

This invention relates to a metal panel having a roughened surface. More particularly, it has particular applicability to aircraft landing mats, and particularly where aircraft use arresting gear for landing. Such mats have requirements as to weight, surface roughness, durability of the rough surface, resistance to heat from jet blast, and other properties such as ability to weather and to take color. The invention also relates to a method by which landing mats having such highly desirable properties may be produced, either in production or in the field. Certain aspects of the method have desirability for field use. The method involves the broad concept of electric arc spray deposit of molten metals. It also involves the use of ceramic metal or hardened grit particles as rough grit to provide the desirable roughened surface.

2. Description of the Prior Art

It has been known to provide roughened metal landing mats previously. Previous expedients have included the rolling in of ceramic grit and the use of epoxy resin binders to hold the grit. A problem with the first of these expedients is difficulty in cutting the mat and a problem with the second is the tendency to crack if there is distortion of the mat. The most important is that the mats cannot be repaired while in place without requirement of excess time.

In addition, it has of course been known to use electric arcs to provide hard surfacing on metal bases. Such expedients are shown for example in Gibson, U.S. Pat. No. 2,709,213, the Richter U.S. Pat. No. 2,841,687, the Todd U.S. Pat. No. 2,994,762, and similar patents. Some of these patents do consider the concept of spreading carbide or other abrasive materials on a surface and then utilizing an electric current so that the base metal or the particles are of themselves in the welding circuit.

The equipment for heating metals or other materials for spray or similar deposit, and the general method of using such equipment is well-known.

Thus, the type or arc and blast equipment utilized in the method of this patent is itself well-known and commercially available.

SUMMARY OF THE INVENTION

A metal panel or mat is provided. Preferably this is aluminum or steel. A rough grit is layed on the panel or mat. The layer of grit is preliminarily locked or bonded to the metal mat by being impacted with a spray of softened and plastic, droplets which impact on the coated mat with low velocities to prebond the grit to the surface. An objective limiting range in this preliminary locking step is that the particles strike the mat at velocities and temperatures low enough so that there is no substantial spattering or blowing or spraying of the loose grit off the mat. The locking coat can be aluminum, steel, stainless, or any other metal required for the secondary bond and the operation requirements. Then, a final coat of relatively high velocity, molten metal is deposited by use of an electric gun. The work piece is not part of the circuit.

The structural details of the electric arc equipment or of conveyors or other production line equipment, are not of the essence of this invention, since such apparatus and the method of using it is well-known in many arts, and therefore, the process is illustrated schematically.

DESCRIPTION OF THE PREFERRED EMBODIMENT

Figure 1:
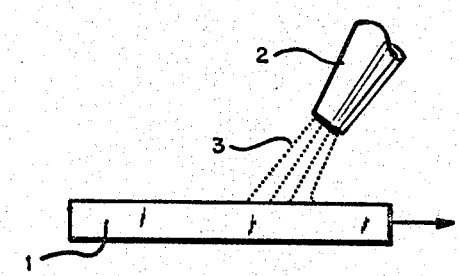
FIG. 1 is a simplified view of a panel being cleaned by grit blasting as a cleaning step.

The invention is briefly, bonding a grit or non-skid material to a surface with a metal. In most general terms, the steps taken are to prepare the surface of the material to be coated by any cleaning method available to remove dirt, acid or grease, such as soap solutions with wetting agents, steam or degreasing agents. Then the surface is roughened by grit blasting, vacuum pressure or centrifugal blasting.

A metal panel or mat, preferably aluminum, although steel and other metals can be used, after being cleaned and roughened, is covered with a layer of rough grit, sized aluminum oxide, steel, glass or stone can be used. Then, a preliminary bonding or locking step is applied. An electric arc metal spray apparatus of conventional construction is provided. The arc melts and atomizes metal, and a blast of gas projects the metal toward and onto the mat. The projecting gas may be air or other suitable gas. The gas pressure and hence its velocity, and the amperage applied in the arc are reduced from normal levels, as is described in more detail below, and the arc apparatus is positioned further away from the work surface than is normal. The purpose of these departures from conventional use of the apparatus is to provide certain conditions of impact on the work surface.

The conditions are that the small metal droplets strike the grit laden mat in a molten state. The gas pressure, amperage, and distance, are chosen so that the metal droplets are in a softened or plastic state, but not vaporized. Furthermore, the velocity of the gas at the point of impact with the grit is such that the grit is not significantly blown around or swept off the surface.

It has been found that if the droplets impinging on the grit are too hot, there is a splattering which is undesirable, and therefore, another objectively determinable limiting factor is that the temperature of the sprayed metal fragments or droplets is low enough ao that splattering is not observed. Another limiting factor is that under this application when enough metal is sprayed so that the grit are bonded together and bonded to the mat, the mat is not heated to a temperature of more than 300°F.

It has been found that this stage does serve to bond the spread grit to the work piece. The sprayed metal droplets do cohere as well as adhere. They are believed not to have a mere mechanical bond, but to have some type of surface effect bonding of a complex nature.

In other arts, specifically in the sintering of powdered metal objects to form structurally strong and usable metal parts, a somewhat related process occurs. In the powdered metal molding arts, it is known that the sintering temperatures do not go to the melting point of the metal, but after the sintering, the metal objects have gone from a relatively weak "green" state to a strong state having structural properties approaching or of the order of magnitude of initially solid metal objects. Of course, in the powdered metal molding arts, the sintering heat is statically applied, thus differing somewhat. It is believed that the exact mechanism by which the bond is formed in the powdered sintering process, even though a much older and better understood art, is a subject of continuing investigation.

After the bonding or locking step, the arc spray applies metal in the conventional manner for surface application of electric arc sprayed materials. That is, in practice, the air pressure is raised, the current is raised, and the arc is brought closer to the work piece so that the metal impinges on the work place at relatively high velocity and in a molten state.

The bonding of alumina to a landing mat with electric arc sprayed aluminum has been found to provide many advantages over other expedients. They include ease of bonding, no cure time, greater non-skid properties, higher melt points, more ductile coating and more corrosion resistance even after initial wipe-off through use. The aluminum bonded material, being relatively soft, provides less wear on an aircraft landing hook. The aluminum having a higher melting point than the bonding epoxies used in other expedients, provides a greater resistance to jet blast erosion.

In production coating, a landing mat 2 by 12 feet can completely processed in a 1 minute cycle or less. The process is also particularly applicable for repair of landing mats in service.

The following is a listing of some of the tests and experiments. Additional data relating to the experiments, and in some cases, general to all of them, is given after the initial listing.

Test Specimen 1. Sand as grit, grain size between 5 mils and 60 mils (considering solids only), about one ounce bonded to the mat. Both stages of spray were electric arc sprayed pure aluminum, with total aluminum coating between 25 and 45 mils.

Test Specimen 2. Four ounces of No. 25 steel grit bonded on the mat using electric arc sprayed aluminum in both stages, with a total spray coat of 15 to 20 mils.

Test Specimen 3. Zirconium oxide, in a mix varying from 60 to 100 mesh. First or bonding coat of electric arc sprayed pure aluminum to 6-8 mils. The second or final coat of plasma sprayed alumina to a depth of an additional 6-8 mils.

Test Specimen 4. Two ounces of No. 24 alundum (alumina) bonded with a preliminary and final coating stage of electric arc sprayed pure aluminum to a depth of 15 to 20 mils. Then painted with fish oil type paint colored green, to a depth of 0.5 to 1 mil, the paint being supplied by Butler Company.

Test Specimen 5. Two ounces of No. 46 alundum (alumina) bonded in two stages as described to a mat with a total of 12-15 mils of electric sprayed pure aluminum then painted as described with test specimen No. 4.

Test Specimen 6. Four ounces of No. 25 steel grit bonded to panel with 15 mils of electric arc sprayed aluminum in two stages as described. Painted in same manner as above specimens.

Test Specimen 7. Three ounces alundum No. 24 (supplied by Norton Co.) bonded panel with 15-18 mils electric arc sprayed pure aluminum in two stages as described. Painted as described above.

Test Specimen 8. Aluminum oxide with grit No. 24 mesh. Bonding stage of electric arc sprayed pure aluminum to 12-18 mils, and final coating stage of plasma sprayed alumina to 5-7 mils.

Test Specimen 9. Three ounces of No. 24 alundum bonded to mat with 12-20 mils of electric arc sprayed pure aluminum, in two stages as described. Painted as described in connection with other specimens.

Test Specimen 10. 2.5 ounces No. 24 alundum bonded to mat with 12-18 mils electric arc sprayed pure aluminum in two stages as described. Painted as described in connection with other specimens.

Test results where non-skid properties were determined in accord with paragraphs 3.9 and 3.7 of MIL-C-81346, for sliding friction on an oily surface with rubber contacting surface.

| Test Specimen | Coefficient of Friction |
| --- | --- |
| 1 | .91 |
| 2 | 1.03 |
| 4 | 1.09 |
| 5 | .97 |

These are all considered to demonstrate very excellent nonskid properties.

Test on the specimens prepared in accordance with this invention resulted in a well bonded surface with a high non-slip rating, and the coatings remained in tact after three landing hook impact tests. Each of the test specimens No. 1, No. 3, No. 4 lost their roughness after the third impact, while No. 2 retained its roughness.

Test specimens No. 6 and No. 7 were the subject of comparison tests of steel grit as opposed to alumina grit. Both panels showed exceptionally good non-skid properties and both were rough after the third impact impact in landing hook tests. There was some crushing of the alundum in specimen 7 thereby resulting in a coating smoother than the specimen 11 coating. Even though the steel grit demonstrates a better ability to maintain roughness after repeated impact, the differential was minor and is off-set as an advantage by the possibility of galvanic or electrolytic action that can result from the combination of iron grit and an aluminum mat.

Figure 2:
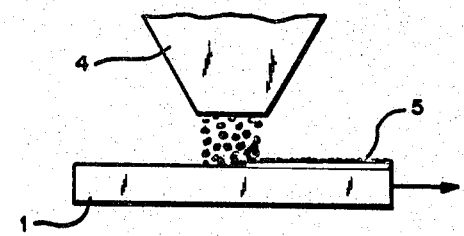
FIG. 2 is a schematic view of a panel being spread with a coating of rough grit.
Figure 3:
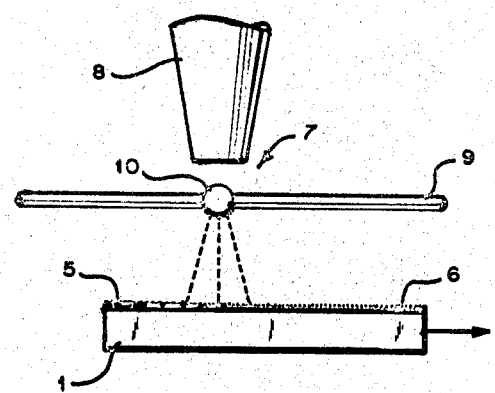
FIG. 3 is a schematic view of the preliminary locking step.

The main aspects of the method are illustrated in the drawings. Four successive main stages are shown. A metal mat 1 is provided and in each of the drawings, the mat moves relatively to the tool in the direction of the arrow. The metal mat 1 is subjected to a surface cleaning. In FIG. 1, a grit blaster 2 sprays abrasive grit 3 over the surface of mat 1 to clean it. In FIG. 2, a feeder 4 deposits the coating grit 5 loosely on the surface of mat 1. In FIG. 3, an electric arc metal spray means is generally designated 7. It includes metal wire 9 to be fed to the arc 10 and an air blast means 8 to spray the metal towward the mat 1. The grit 5, in its preliminary bonded state is designated by reference numberal 6.

Figure 4:
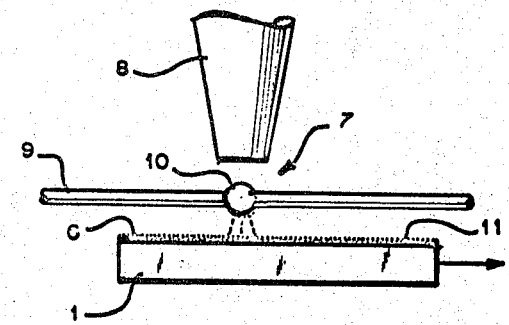
FIG. 4 is a schematic view of the final coating step.

FIG. 4 shows the final essential stage in the process in which the final coating is applied. The electric arc means generally designated 7, in one embodiment is now provided with metal wire 9 so that the final coating on the bodied grit 6 is of metal, resulting in the final roughened surface 11. The electric arc apparatus 7 is shown closer to the work piece in FIG. 4, in accord with the process as it has been described.

In the initial locking stage, the following specific conditions have been found satisfactory with regard to the test specifmens. The arc apparatus is positioned 18 inches from the mat. The atomizing air is supplied at 10 to 25 psi. Electricity is supplied at 30 volts and 100 amps. A one-eighth inch diameter aluminum wire is provided. While these specifications have been found suitable it is understood that a more direct reading of the critical aspect relates to the condition of the aluminum as it strikes the mat, as has been described. The blast is mechanically weak enough so that it does not blow the loose grit away. The temperature of the aluminum as it strikes the mat is low enough so that it does not spatter. The aluminum particles are believed to be on the order of magnitude of 10-25 microns. They are hot and at a temperature so that they are easily flowable and plastic, and are in a molten state. The velocity of the particles is believed to be of the order of magnitude of 450 feet per second. There is believed to be a solid phase type of bonding of the aluminum particles to each other and to the grit and the mat.

The final or coating stage of aluminum may be applied with an electric arc gun positioned about three inches from the mat, with atomizing air supplied at 70 psi, voltage 30, and amperage 200. The final or coating stage, while specifications as described above have been found satisfactory, is more directly measured by stating that the material to be applied, whether it is pure aluminum or other metal, is applied under the conditions normally encountered in commercial application of ordinary coatings of such materials to metal bases. For example, the application of aluminum in this final coating is under the conditions known as electric arc spray or deposit, which is similar to the oxyacetylene metallizing technique.

For production, the following general conditions can be applied.

1. Mat placed on pallet.
2. Pallet set on feeding mechanism.
3. Mat moves at rate of 24 ft. per minute along conveyor under a steam or solvent cleaning unit.
4. A urethane mask is placed over the mat to expose the area to be grit blasted. The area is grit blasted.
5. The mask is removed.
6. Aluminum oxide is spread on mat with an abrasive feeder.
7. Mat is passed under preliminary bonding gun travelling at 200 ft. per minute in a cross feed reciprocating manner. Bonding gun is positioned 18 inches from mat, atomizing, air is provided at 10 psi at 100 amps and 30 volts. One-eighth inch diameter aluminum wire is provided. The coating deposit is 2-5 mils.
8. The final coating is applied. The panel travels under a set of three electric arc guns, set 8 inches apart and travelling at a speed of 200 feet per minute in a cross feed reciprocating manner. The guns are positioned 3 inches from the mat, atomizing air is provided at 70 pounds per square inch, at 200 amps and 30 volts. No. 1345, one-eighth inch diameter alundum wire is fed through the guns, depositing approximately 6-8 mils of coating.
9. The mat reaches the temperature of approximately 150°F., ranging between 140° and 160°F., and is spray painted with 0.5 to 1 mil marine green No. 23 paint.

It has been found that a suitable aluminum is the type designated as No. 1345 alloy, and a suitable aluminum oxide is the type designated as alundum No. 24 mesh.

I claim:

1. A method of producing a non-skid, or anti-slip, surface on a sheet of metal which comprises the steps of depositing a loose layer of grit particles on a surface of the sheet, projecting droplets of metal in a softened condition onto the particles of grit without substantially displacing said particles with respect to each other or with respect to said sheet so as to establish an incomplete and partially fused metallic bond between the particles of grit and said sheet, and thereafter forcibly projecting hot molten metal against the upper surface of said incompletely bonded particles of grit with a velocity and at a temperature sufficient to at least partially remelt the metal initially applied to said grit and establish a secure bond between said particles and said sheet of metal.

2. The method as defined in claim 1 wherein the surface of said sheet of metal is roughened prior to the depositing of grit thereon.

3. The method as defined in claim 1 wherein the metal projected onto said particle of grit is a corrosion resistant metal.

4. The method as defined in claim 1 wherein said metal is projected onto the particles of grit by directing air across an electric arc to which a metal wire is supplied.

5. The method as defined in claim 1 wherein the metal in a softened condition is projected onto the loose particles of grit by means of an electric arc and an air jet spaced a predetermined distance from the metal sheet, and the hot molten metal is subsequently projected forcibly against the preliminarily bonded particles of grit by means of an electric arc and an air jet positioned a lesser distance from said sheet of material.

6. The method as defined in claim 1 wherein said particles of grit are formed of abrasive material.

* * * * *

UNITED STATES PATENT AND TRADEMARK OFFICE
CERTIFICATE OF CORRECTION

PATENT NO. : 3,855,444
DATED : December 17, 1974
INVENTOR(S) : Maximilian Palena It is certified that error appears in the above-identified patent and that said Letters Patent are hereby corrected as shown below:

The notice of this patent should be amended to read as follows: "The portion of the term of this patent subsequent to September 17, 1988, has been disclaimed."

Signed and Sealed this second Day of March 1976

[SEAL]

Attest:

RUTH C. MASON
*Attesting Officer*

C. MARSHALL DANN
*Commissioner of Patents and Trademarks*